US009202080B2

(12) United States Patent
Milman et al.

(10) Patent No.: US 9,202,080 B2
(45) Date of Patent: *Dec. 1, 2015

(54) METHOD AND SYSTEM FOR POLICY DRIVEN DATA DISTRIBUTION

(75) Inventors: Ivan M. Milman, Austin, TX (US);
Charles D. Wolfson, Austin, TX (US);
Matthias Schunter, Zurich (CH);
Heather M. Hinton, Austin, TX (US);
Michael P. Waidner, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 185 days.

This patent is subject to a terminal disclaimer.

(21) Appl. No.: 13/417,691

(22) Filed: Mar. 12, 2012

(65) Prior Publication Data

US 2012/0191731 A1     Jul. 26, 2012

Related U.S. Application Data

(63) Continuation of application No. 12/648,876, filed on Dec. 29, 2009.

(51) Int. Cl.
*G06F 17/30* (2006.01)
*G06F 21/62* (2013.01)
(52) U.S. Cl.
CPC .................................. *G06F 21/6245* (2013.01)
(58) Field of Classification Search
CPC .................................................. G06F 21/6245

USPC ......... 707/706, 713, 722, 736, 752, 754–758, 707/781, 999.005; 726/1

See application file for complete search history.

(56) References Cited

U.S. PATENT DOCUMENTS

| 6,006,333 | A | 12/1999 | Nielsen |
| 7,139,838 | B1 | 11/2006 | Squire et al. |
| 7,716,242 | B2 | 5/2010 | Pae et al. |
| 7,926,089 | B2 | 4/2011 | Tulshibagwale et al. |
| 8,140,527 | B2 | 3/2012 | Halme et al. |
| 2004/0128546 | A1 | 7/2004 | Blakley et al. |
| 2005/0027980 | A1 | 2/2005 | Peled et al. |
| 2006/0085443 | A1* | 4/2006 | Pae et al. .......................... 707/100 |
| 2008/0010665 | A1* | 1/2008 | Hinton et al. ...................... 726/1 |
| 2009/0300716 | A1 | 12/2009 | Ahn |
| 2010/0223379 | A1 | 9/2010 | Tantawi et al. |
| 2011/0289314 | A1* | 11/2011 | Whitcomb .................... 713/155 |

FOREIGN PATENT DOCUMENTS

EP          1318465 A2     3/2002

* cited by examiner

*Primary Examiner* — Syling Yen
(74) *Attorney, Agent, or Firm* — Terrile, Cannatti, Chambers & Holland, LLP; Stephen A. Terrile (57) ABSTRACT

A method, system and computer-usable medium are disclosed for controlling the distribution of data. Data stored in a datastore is filtered according to a data release policy to generate filtered data. A data release policy agreement, corresponding to the data release policy, is generated. The filtered data and the data release policy agreement are then provided to an information consumer. The data release policy agreement is then used to enforce the data release policy.

4 Claims, 9 Drawing Sheets

METHOD AND SYSTEM FOR POLICY DRIVEN DATA DISTRIBUTION

CROSS-REFERENCE TO RELATED APPLICATION

This application is related to U.S. patent application Ser. No. 12/648,813, entitled "Method and System for Policy Driven Data Disclosure" filed on Dec. 29, 2009, which describes exemplary methods and systems and is incorporated by reference in its entirety.

BACKGROUND OF THE INVENTION

1. Field of the Invention

Embodiments of the disclosure relate in general to the field of computers and similar technologies, and in particular to software utilized in this field. Still more particularly, it relates to providing policy-controlled distribution of data.

2. Description of the Related Art

In recent years, companies have become increasingly concerned not only about the security of their information, but also how it is used and to where it goes. As a result, a wide variety of security mechanisms have been implemented to not only authenticate users and information-consuming applications, but to also control how they access the information as well. In particular, these companies are concerned about maintaining the integrity of key business data related to their customers, partners, employees, products, suppliers, resources, etc. This information, often referred to as master data, is commonly used to support transactional and operational processes as well as analytics and reporting. Master data is generally centralized, but there are times when it is copied to other repositories (e.g., to a warehouse for analytics, for a legacy application that can only use its own database, or something outside of the enterprise that doesn't have direct access to the meta data).

Companies are also concerned about the internal and external release of personally-identifiable information (PII), which refers to information that can be used to uniquely identify or trace an individual's identity. Examples of PII include an individual's name, social security number, biometric records, etc., which may be used alone, or in combination with other personal or identifying information such as date and place of birth or mother's maiden name. Depending on their intended use, many companies are requiring that certain PII data elements be masked or transformed. As an example, the first twelve digits of an individual's credit card number may be replaced with an 'X' in a promotional mailer. As another example, the letters of a person's first and last name may be transformed (e.g., 'Joe Smith' for 'Tom Jones'), yet their physical address remain unchanged (e.g., '111 State Street) when used for testing a mailing list application.

As a result, companies are beginning to implement data release policies to ensure that users and applications can only access information to which they are entitled or authorized. However, such policies often lack flexibility, which may unnecessarily restrict legitimate access to information. In other cases, data release policies lack scalability, which may limit the ability to apply policies tailored to the individual needs of a wide spectrum of information consumers. Furthermore, current approaches to data release policies are often difficult to enforce once the data has been released. As an example, an application that provides master data may share a common data release policy enforcement mechanism with an application that consumes it. If this is the case, then a data release policy associated with the master data can be enforced. However, if that is not the case, or if the master data consuming application is associated with no data release policy enforcement mechanism whatsoever, then the enforcement of the data release policy becomes more problematic or impossible. In view of the foregoing, there is a need for flexible, scalable, and enforceable release policies for the release of information based not solely on the information itself, but rather with agreements with respect to consumers of the data.

BRIEF SUMMARY OF THE INVENTION

The present invention includes, but is not limited to, a method, system and computer-usable medium for controlling the distribution of data. In various embodiments, a data release policy management module is implemented to manage the release of data according to a data release policy. In these and other embodiments, data is transferred to an information consumer. A data release policy associated with the application is then used to filter data stored in a datastore. The filtered data is then provided to the information consumer with a data release policy agreement if the data release policy is supported by the information consumer. In various embodiments, the data release policy agreement is used by the data release policy management module to enforce the corresponding data release policy. In these and other embodiments, the filtered data is masked according to the data release policy.

In one embodiment, the data available to a first information consumer is stored in a first datastore and filtered according to a first data release policy. In another embodiment, the data available to a second information consumer is stored in the first datastore and filtered according to a second data release policy. In yet another embodiment, the data available to a first and second information consumer is respectively stored in a first and second datastore and is respectively filtered according to corresponding first and second data release policies.

In one embodiment, the first data release policy is used to determine whether to filter data used by a plurality of information consumers and the filtered data is stored in a first datastore. Before transferring data to one of the plurality of information consumers, a second, corresponding data release policy is used to produce a filtered set of data for the requesting information consumer. In another embodiment, a plurality of data release policies, each corresponding to one or more of a plurality of information consumers, are stored in a centralized repository and are used with certain respective information consumers. In another embodiment, the filtering of data for a downstream information consumer is performed by an intermediary data release policy management module. In yet another embodiment, the filtering of data is performed according to specifics of the data release policy of the information consumer. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

A method, system and computer-usable medium are disclosed for controlling access to data information. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
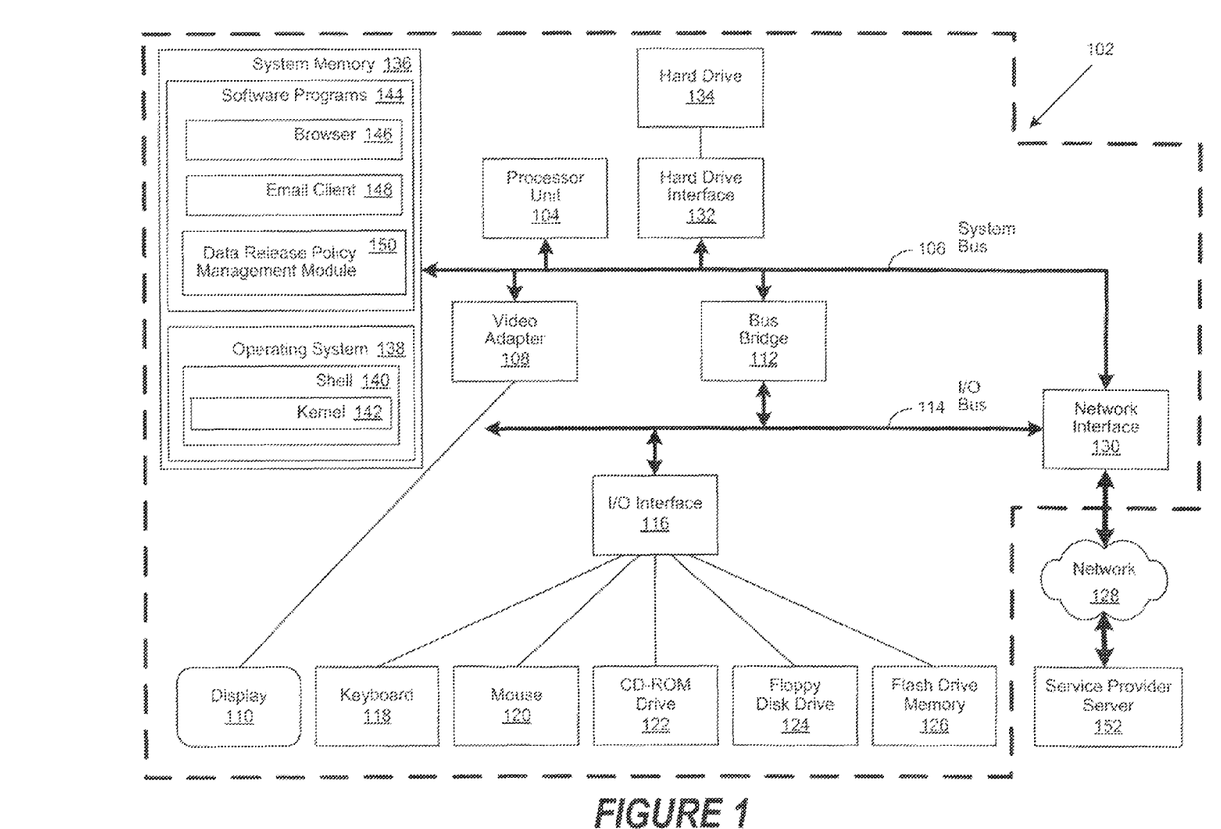
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a data release policy management module 150. The data release policy management module 150 includes code for implementing the processes described in FIGS. 2 through 8 described hereinbelow. In one embodiment, client computer 102 is able to download the data release policy management module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
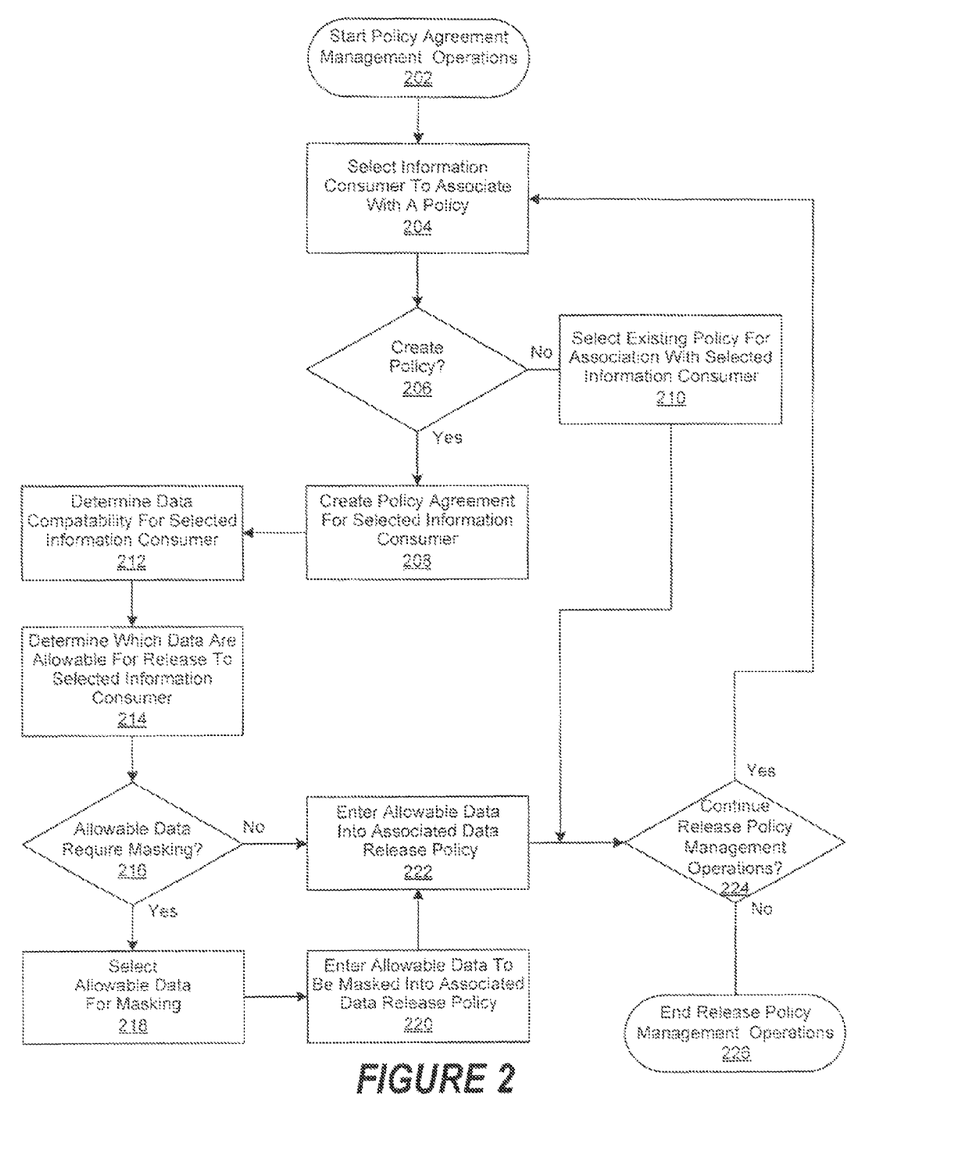
FIG. 2 is a flowchart for the management of a data release policy.

FIG. 2 is a flowchart for the management of a data release policy as implemented in accordance with an embodiment of the invention. In this embodiment, data release policy management operations start in step 202, followed by the selection in step 204 of an information consumer to associate with a data release policy. As used herein, an information consumer broadly refers to any receiver of data, including but not limited to a user, a device, a system, a software application, or a process. In various embodiments, the information consumer may be a class of consumers, such as all requests related to a marketing function or all requests from an Enterprise Resource Planning (ERP) system. A determination is then made in step 206 whether the creation of a data release policy is required. In one embodiment, the data release policy is centralized and supports a single datastore. In another embodiment, the data release policy is centralized and supports a plurality of datastores. In yet another embodiment, data release policies are distributed, each supporting one or more datastores.

If it is decided in step 206 to create a policy for association with the selected information consumer, then it is created in step 208. Otherwise, a data release policy is selected for association with the selected information consumer in step 210. Once a data release policy has been created in step 208, the data requirements for the selected information consumer are determined in step 212. A determination is then made in step 214 as to which data is allowable for release to the selected information consumer.

A determination is then made in step 216 whether the allowed data requires masking. In one embodiment, the data masking comprises substituting a null value (e.g., an 'X') in place of a character or numeric value. In another embodiment, the data masking comprises transforming data elements (e.g., 'Joe Smith' for 'Tom Jones'). In yet another embodiment, the data masking comprises encrypting data elements using cryptography approaches known to those of skill in the art. It will be apparent to those of skill in the art that many such embodiments are possible and the foregoing is not intended to limit the spirit, scope, or intent of the invention. If it is determined in step 216 that the allowable data requires masking, then the allowable data to be masked is selected in step 218 and then entered into the associated data release policy in step 220. In various embodiments, the allowable data to be masked is selected based on its associated metadata and the policy. As an example, the data may have associated metadata indicating that it is a Social Security Number. In various other embodiments, the allowable data to be masked is selected based on attributes associated with the data. As an example, the data may have an associated attribute indicating that the data is associated with a financial account. Once entered, or if it is determined in block 216 that the allowable data does not require masking, then the allowable data is then entered into the data release policy associated with the selected information consumer in step 222. A determination is then made in step 224 whether to continue data release policy management operations. If so, the process continues, proceeding with step 204. Otherwise, data release policy management operations are ended in step 226.

Figure 3A:
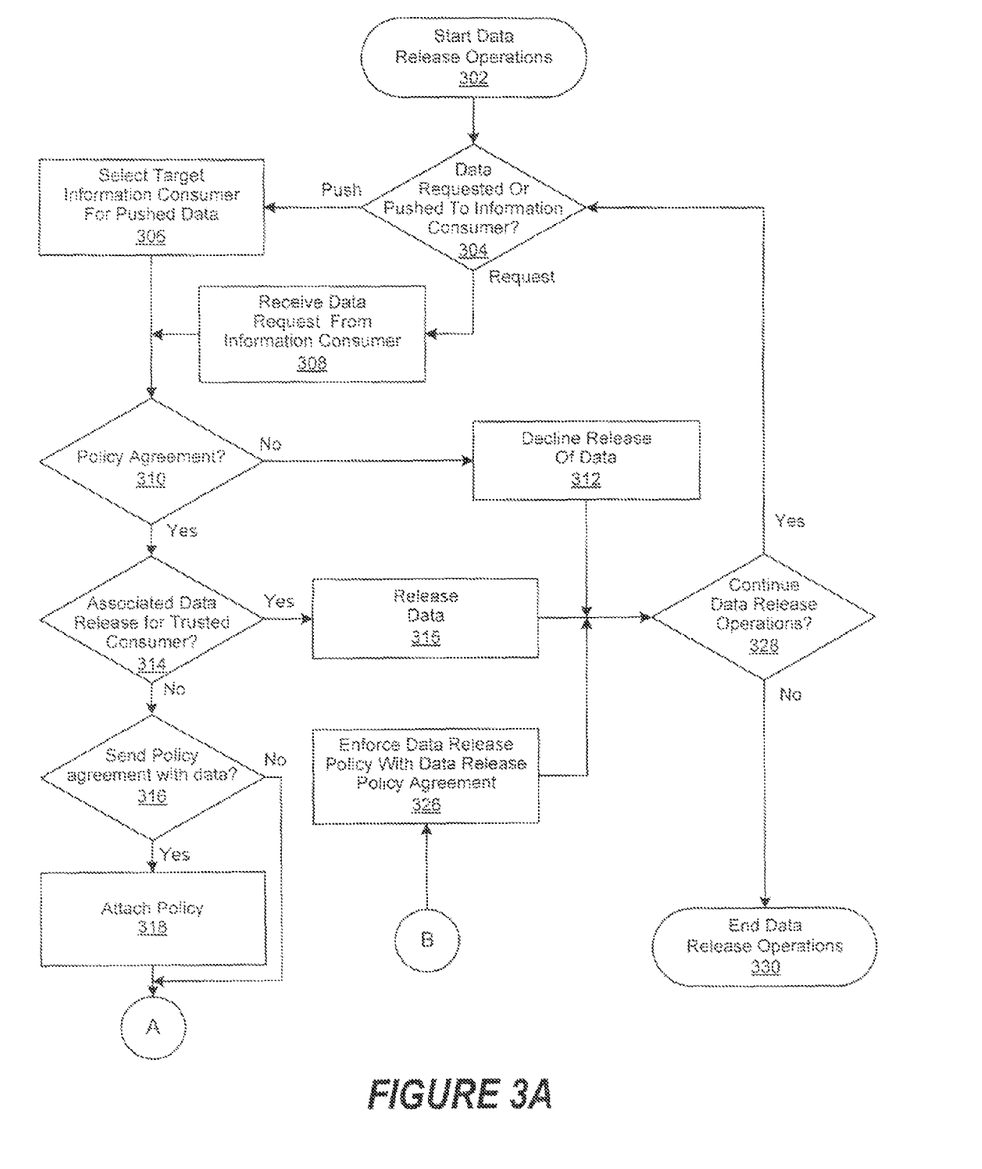
FIG. 3 is a flowchart for the release of data according to a data release policy.
Figure 3B:
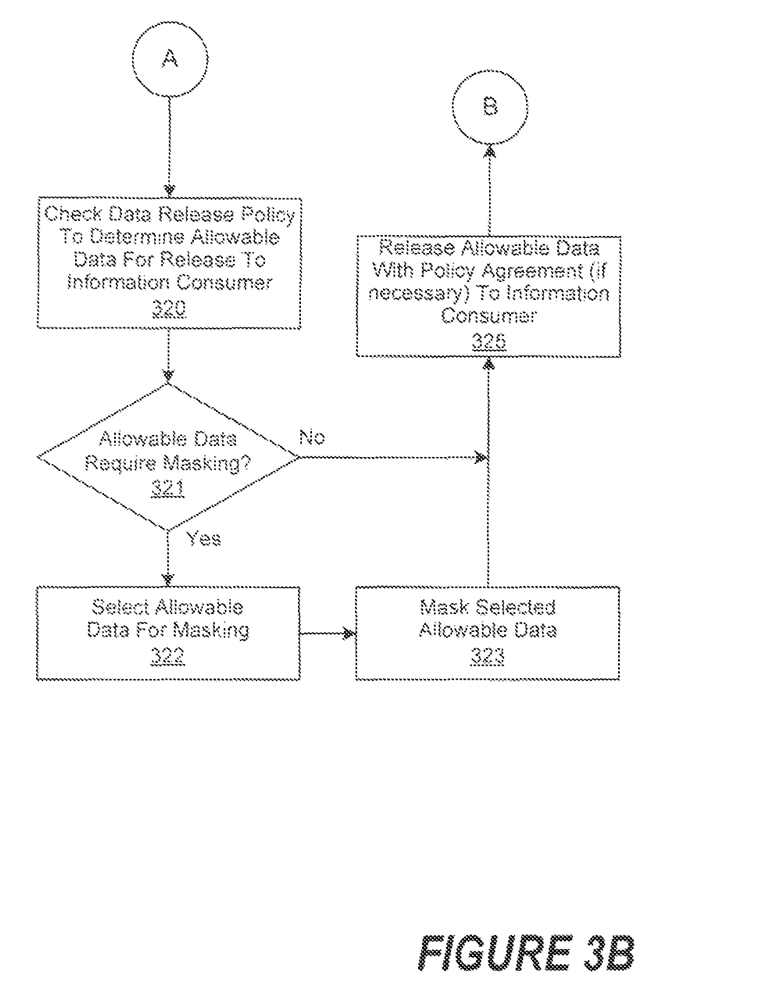

FIG. 3 is a flowchart for the release of data according to a data release policy as implemented in accordance with an embodiment of the invention. In this embodiment, data release operations are begun in step 302, followed by a determination being made in step 304 whether the released data will be pushed to a predetermined information consumer or released in response to a request from an information consumer. If it is determined in step 304 that the released data will be pushed to a predetermined information consumer, then the information consumer is selected in step 306. Otherwise, a data request is received from an information consumer in step 308. Once a data request has been received in step 308, or an information consumer selected in step 306, a determination is made in step 310 whether a policy agreement is associated with the respective information consumer. If not, then the release of data is declined in step 312, followed by a determination being made in step 328 whether to continue data release operations. If so, then the process is continued, proceeding with step 304. Otherwise, data release operations are ended in step 330.

However, if it is determined in step 310 that the information consumer is associated with a policy agreement, then the associated policy agreement is checked in step 314 to determine whether the data release is for a trusted consumer. If so, then the data is released at step 315 and the process continues to step 328. If not, then it is determined whether to send a policy agreement with the data at step 316. If so, then the policy is attached at step 318. If not, then the data release policy is checked to determine allowable data to release to the information consumer at step 320.

After the policy is attached at step 318, then the data release policy is checked to determine allowable data to release to the information consumer at step 320. Once checked, a determination is made in step 321 whether any of the allowable data requires masking. If so, then the allowable data requiring masking is selected in step 322 and then it is masked in step 323 as described in greater detail herein. If not, or after the data is masked, the associated data release policy is delivered (if necessary) to the information consumer with the allowable data in step 325. As an example, the data release policy may be delivered in an Extensible Access Control Markup Language (XACML) format. Otherwise, the allowable data is delivered to the information consumer without the associated data release policy in step 328. Once the data release policy is enforced in either step 326, a determination is made in step 328 whether to continue data release operations. If so, then the process is continued, proceeding with step 304. Otherwise, data release operations are ended in step 330.

Figure 4:
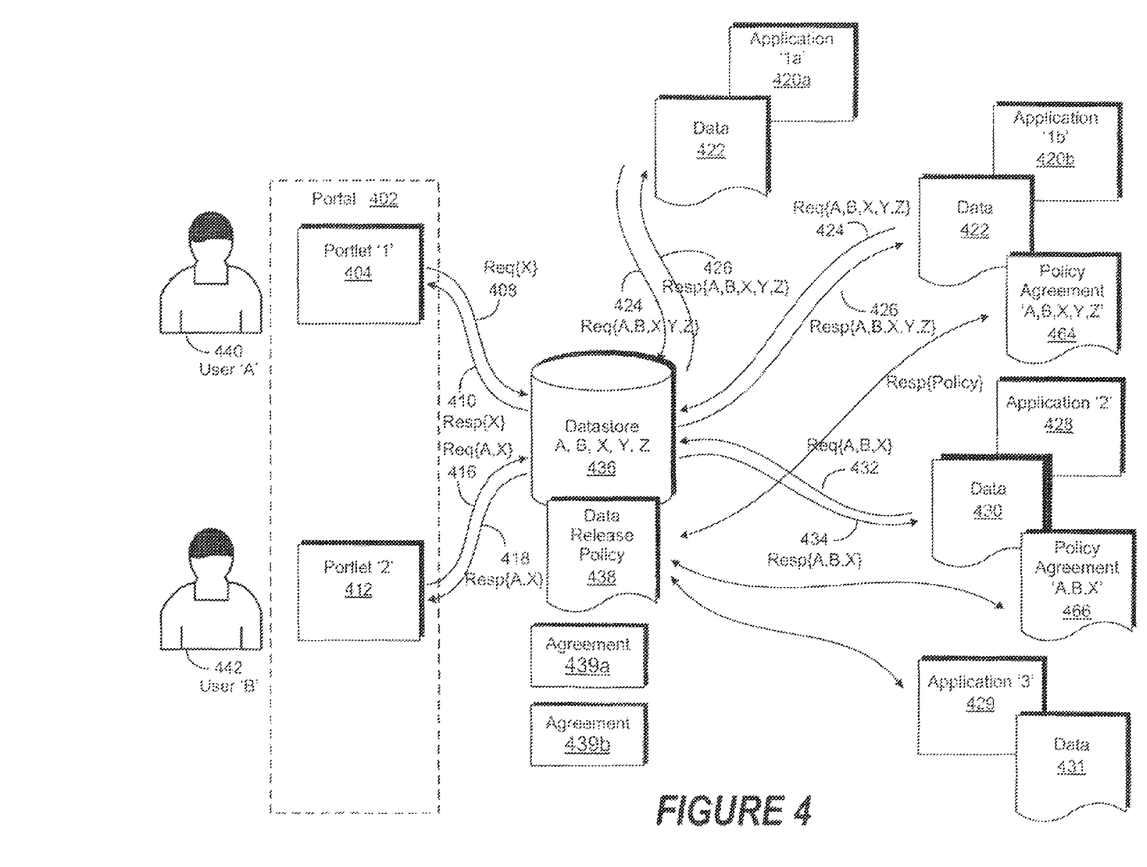
FIG. 4 shows the implementation of a data release policy for a centralized datastore.

FIG. 4 shows the implementation of a data release policy for a centralized datastore as implemented in accordance with an embodiment of the invention. In this embodiment, data release policy 438 controls the release of data stored in datastore 436 to portlet '1' 404, portlet '2' 412, application '1a' 420a, application '1b' 420b (generally referred to as application '1'), application '2' 428 and application '3' 429. Referring now to FIG. 4, portal 402 comprises portlet '1' 404 and portlet '2', further comprising data 406, 412 respectively. Likewise, applications '1a' 420a and '1b' 420b further comprise data 422 application '2' 428 further comprises filtered data 430 and application '3' further comprises data 431.

In one embodiment, the data 422, 430, 431 respectively used by application '1' 420, application '2' 428 and application '3' 429 are defined on a per-application basis, while their allowable release is defined by data release parameters contained in the data release policy 438. As an example, the data release parameters may be based on predetermined characteristics of the data itself and any release controls that have been put on that data by the data owner (e.g., the entity that has responsibility over the data stored within the datastore 436). As another example, the data release parameters may be based on the context in which the data is released, such as what other data that is requested at the same time or by the same information consumer. As yet another example, the data release parameters may be based on the identity of the information consumer, such as user 'A' 440 or 'B' 442, or application '1' 420 or '2' 428 requesting the release of the data. In these examples, the data release parameters may be further based on ancillary policies, such as time of day, frequency of request, and so on.

As shown in FIG. 4, datastore 436 comprises aggregated data 'A', 'B', 'X', 'Y', and 'Z' as well as agreements 439a and 439b. Portlet '1' 404 places a request 408 for data 'X', and if the request is allowed by data release policy 438, a response 410 comprising data 'X' 406 and data release policy agreement 'X' 460 is returned. Likewise, portlet '2' 412 places a request 416 for data 'A' and 'X', and if the request is allowed by data release policy 438, a response 418 comprising data 'A,X' 414 and data release policy agreement 'A,X' 462 is returned.

Additionally, there are a number of instances where data may be transferred in bulk to an application either due to a request from the application or due to a push operation from the datastore 436 to the application. In these instances, the data release policy 438 is compared against an application's level of trust. Depending on the level of trust that is established based at least in part upon the policy agreement of the application, some or all of the data from datastore 436 may be transferred to the application. In each instance, an application specific policy agreement (e.g., agreement 439a) is compared against the general data release policy 438 to determine an amount of data to transfer to the application For example, application '1a' 420a may represent an application for which a high degree of trust is present as indicated by the data release policy 438 and the policy agreement 439a. An application may be entitled to a high degree of trust due to the application using the same policy enforcement mechanism as the datastore 436. Thus, if application '1a' 420a places a request 424 for data "A', 'B', X', 'Y' and 'Z', a response 426 comprising data 'A,B,X,Y,Z' 422 is provided to application '1'. With application '1a' 420a, the policy agreement 438 from the datastore 436 may be used as the policy agreement which governs release of the data. The data 'A,B,X,Y,Z' 422 may be complete enough to allow Application '1' to clone the data stored within datastore 436 along with the data release policy 438. An example of this type of application might be a warehouse that is cloning data from a master data management (MDM) type datastore. Such an application would allow offloading of analytic type processing requirements to the warehouse while allowing the MDM type datastore to perform transactional type operations on the data. Often, the high degree of trust is present because a previous trust relationship has been established. Such an application often has a legitimate need for access to the unmasked data. However, because the application uses the policy agreement 439a from the datastore 436, this data is safe with this application Also, for example, application '1b' 420b may represent an application for which a high degree of trust is present as indicated by the data release policy 438 and the policy agreement 464. An application may be entitled to a high degree of trust due to the application by using a data release policy which is an equivalent of the policy 438 of the datastore 436. Thus, if application '1b' 420b places a request 424 for data "A', 'B', X', 'Y' and 'Z', a response 426 comprising data 'A,B,X,Y,Z' 422 and data release policy 'A,B,X,Y,Z' 464 is provided to application '1b'. The data 'A,B,X,Y,Z' 422 may be complete enough to allow Application '1b' to clone the data stored within datastore 436 along with the data release policy 438. An example of this type of application might be a warehouse that is cloning data from a master data management (MDM) type datastore. Such an application would allow offloading of analytic type processing requirements to the warehouse while allowing the MDM type datastore to perform transactional type operations on the data. Often, the high degree of trust is present because a previous trust relationship has been established. Such an application often has a legitimate need for access to the unmasked data. However, because the application has agreed to the data release policy, this data is safe with this application Also for example, Application '2' 428 may represent an application which has a somewhat lower degree of trust as indicated by the data release policy 436 and the policy agreement 466. Due to this lower degree of trust, application '2' may only be entitled to access to data 'A', 'B' and 'X' from datastore 436. With application that have this type of trust relationship, the data release policy controls how to protect individual elements of the data regardless of to whom the data goes and also controls what level of policy to apply when the data is provided to the application. Thus, when Application '2' places a request 432 for data 'A', 'B' and 'X', a response 434 comprising filtered data 'A,B,X' 430 and data release policy agreement 'A,B,X' 466 is provided to application '2'.

Also, for example, 'Application '3' 429 may represent an application which has a very low degree of trust as indicated by the data release policy 436. Application '3' may not have any policy agreement in place. In this case, even if a request for data transfer is received, datastore 436 would not provide any data to the application.

Figure 5:
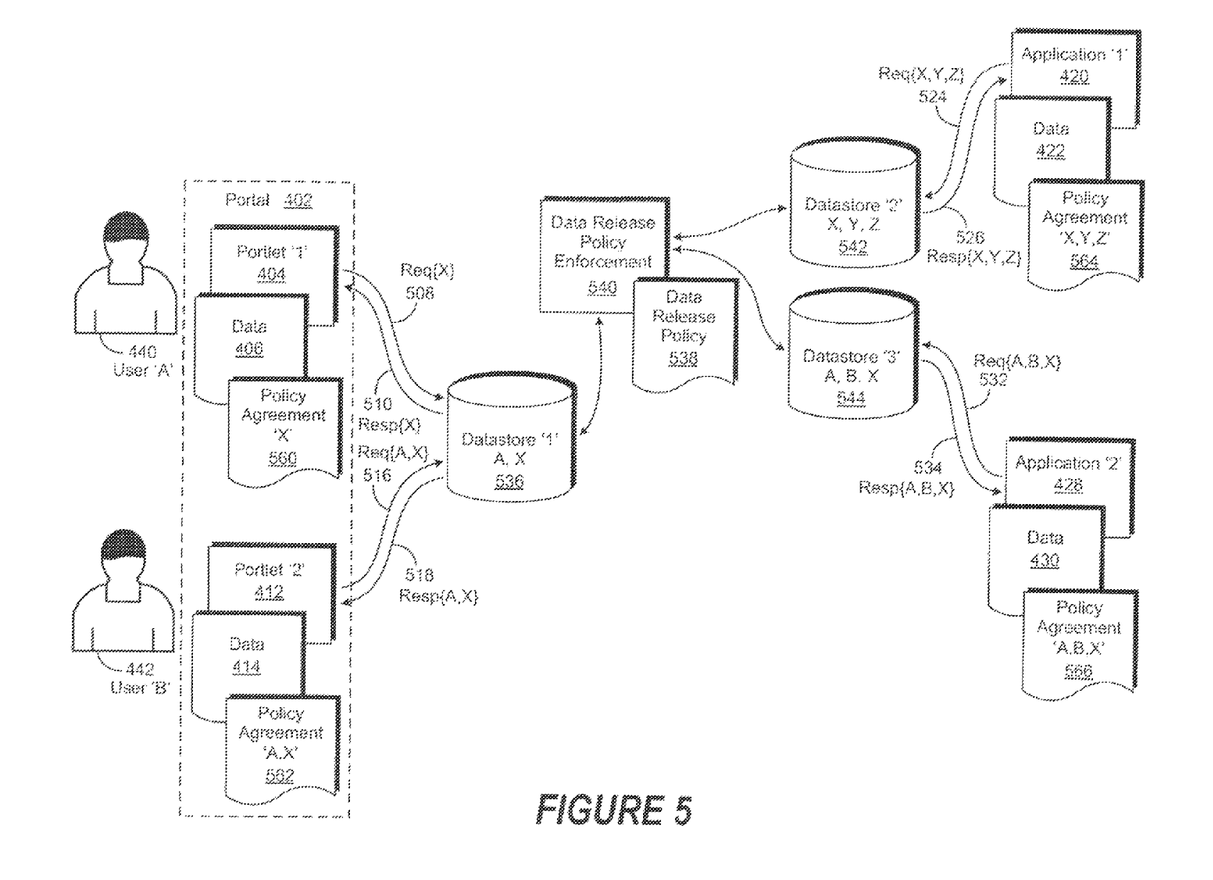
FIG. 5 shows the enforcement of an centralized data release policy for a plurality of datastores.

FIG. 5 shows the enforcement of a centralized data release policy for a plurality of datastores as implemented in accordance with an embodiment of the invention. In this embodiment, the release of data stored in datastores '1' 536, '2' 542, and '3' 544 is centrally controlled by the data release policy enforcement module 540 according to data release policy 538. As shown in FIG. 5, datastore '1' 536 comprises data 'A', 'X', whereas datastore '2' 542 comprises data 'X', 'Y', 'Z', and datastore '3' 544 comprises data 'A', 'B', 'X'.

Portlet '1' 404 places a request 508 on behalf of user 'A' 440 for data 'X' from datastore '1' 536. The data release policy enforcement module 540 then checks to see if the request is allowed by data release policy 538, and if so, a response 510 comprising data 'X' 406 and data release policy agreement 'X' 560 is returned. Likewise, portlet '2' 412 places a request 516 on behalf of user 'B' 442 for data 'A' and 'X'. The data release policy enforcement module 540 then checks to see if the request is allowed by data release policy 538, and if so, a response 516 comprising data 'A,X' 414 and data release policy agreement 562 is returned. In one embodiment, data 'A' and 'X' is respectively copied by the data release policy enforcement module 540 from physically-separate datastores '2' 542 and '3' 544 to physically-separate datastore '1' 536. It will be appreciated that copying data 'A' and 'X' to the physically-separate datastore '1' 536 provides additional security and control as portlets '1' 404 and '2' 412' are prevented from accessing other data stored in the physically-separate datastores '2' 542 and '3' 544.

Likewise, application '1' 420 places a request 524 for data 'X', 'Y' and 'Z' stored in datastore '2' 542. The data release policy enforcement module 540 then checks to see if the request is allowed by data release policy 538, and if so, a response 526 comprising filtered data 'X,Y,Z' 422 and data release policy agreement 'X,Y,Z' 564 is returned. Application '2' 428 likewise places a request 532 for data 'A', 'B', and 'X' stored in datastore '3' 544. The data release policy enforcement module 540 then checks to see if the request is allowed by data release policy 538, and if so, a response 534 comprising filtered data 'A,B,X' 430 and data release policy agreement 'A,B,X' 566 is returned.

It will be further appreciated that segregating data 'X', 'Y' and 'Z' to the physically-separate datastore '2' 542 provides additional security and control as application '2' 428 is prevented from accessing that data. Likewise, segregating data 'A', 'B', and 'X' to the physically-separate datastore '3' 544 provides additional security and control as application '1' 420 is prevented from accessing that data. It will likewise be apparent to those of skill in the art that data-level disclosure is provided by ensuring that application '1' 420 and '2' 428 only has access to the data it needs and no others, based on the contents of each application's respective and associated datastore '2' 542 and '3' 544. In various embodiments, the data release policy agreements 'X' 560, 'A,X' 562, 'X,Y,Z' 564, and 'A,B,X' 566 associated with the data release policy 538 are enforced by the data release policy enforcement module 540.

Figure 6:
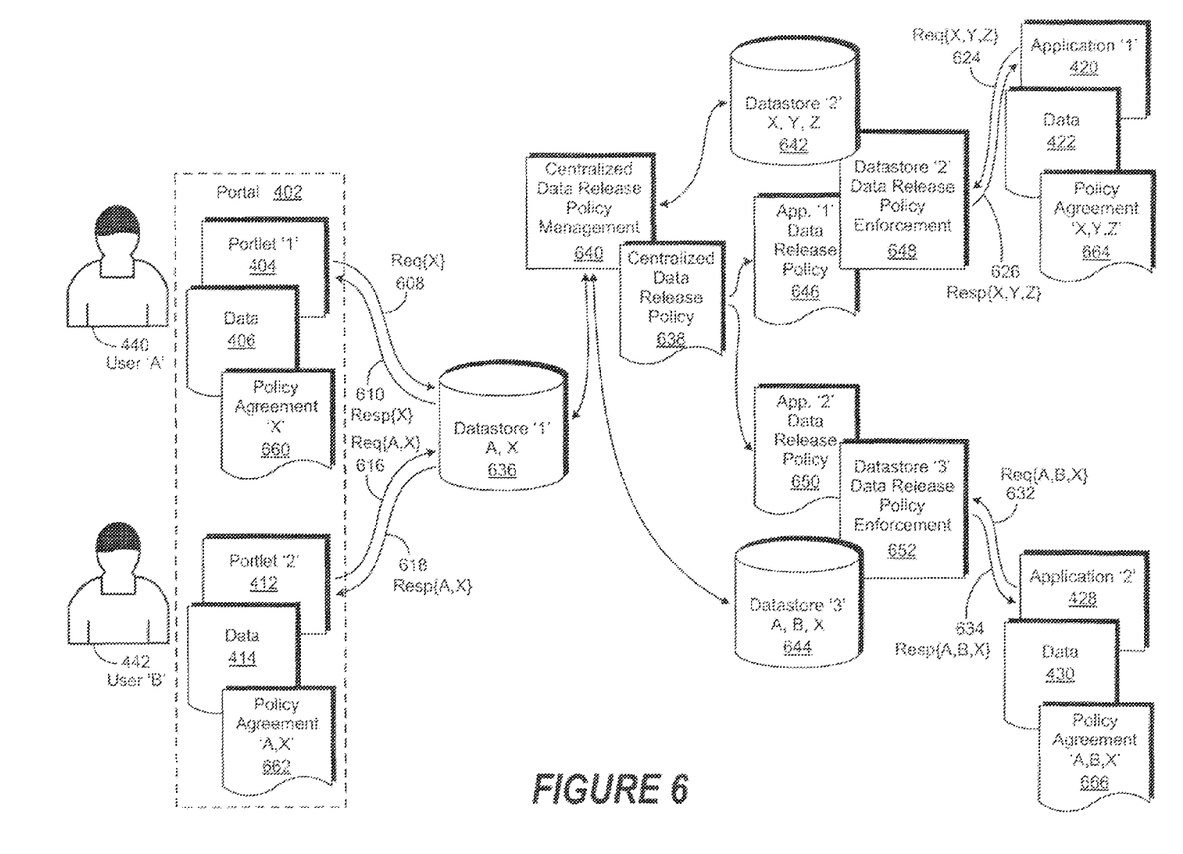
FIG. 6 shows the distributed enforcement of distributed, application-specific data release policies for a plurality of datastores.

FIG. 6 shows the distributed enforcement of distributed, application-specific release policies for a plurality of datastores as implemented in accordance with an embodiment of the invention. In this embodiment, the release of data stored in datastores '1' 636, '2' 642, and '3' 644 is centrally controlled by the centralized data release policy management module 640 according to centralized data release policy 638. In turn, the centralized data release policy 638 is used by the centralized data release policy management module 640 to update the application '1' data release policy 646 and the application '2' data release policy 650. Accordingly, the release of data stored in datastore '2' 642 is further controlled by datastore '2' data enforcement module 648 according to the application '1' data release policy 646. Likewise, the release of data stored in datastore '3' 644 is further controlled by datastore '2' data enforcement module 652 according to the application '2' data release policy 650. As a result, the data 'X', 'Y', 'Z' available to application '1' 420 from datastore '2' 642 and the data 'A', 'B', 'X' available to application '2' 428 from datastore '3' 644 is doubly-filtered.

As shown in FIG. 6, datastore '1' 636 comprises data 'A', 'X', whereas datastore '2' 642 comprises data 'X', 'Y', 'Z', and datastore '3' 644 comprises data 'A', 'B', 'X'. Portlet '1' 404 places a request 608 on behalf of user 'A' 440 for data 'X' from datastore '1' 636. The data release policy management module 640 then checks to see if the request is allowed by data release policy 638, and if so, a response 610 comprising data 'X' 406 and data release policy agreement 'X' 660 is returned. Likewise, portlet '2' 412 places a request 616 on behalf of user 'B' 442 for data 'A' and 'X'. The data release policy management module 640 then checks to see if the request is allowed by data release policy 638, and if so, a response 616 comprising data 'A,X' 414 and data release policy agreement 'A,X' 662 is returned. As likewise shown in FIG. 6, the data release policy agreements 'X' 660 and 'A,X' 662 are generated and manage by the centralized data release policy management module 640 to enforce the centralized data release policy 638.

Likewise, application '1' 420 places a request 624 for data 'X', 'Y' and 'Z' stored in datastore '2' 642. The datastore '2' data release policy enforcement module 648 checks to see if the request is allowed by the application '1' data release policy 646, and if so, a response 626 comprising filtered data 'X,Y,Z' 422 and data release policy agreement 'X,Y,Z' 664 is returned. As shown if FIG. 6, the data release policy agreement 'X,Y,Z' 664 is generated and managed by the datastore '2' data release policy enforcement module 648 to enforce the application '1' data release policy 646. Application '2' 428 likewise places a request 632 for data 'A', 'B', and 'X' stored in datastore '3' 644. The datastore '3' data release policy enforcement module 652 checks to see if the request is allowed by application '2' data release policy 650, and if so, a response 634 comprising filtered data 'A,B,X' 430 and data release policy agreement 'A,B,X' 666 is returned. As shown if FIG. 6, the data release policy agreement 'A,B,X' 666 is generated and managed by the datastore '3' data release policy enforcement module 652 to enforce the application '2' data release policy 650.

It will be appreciated that in addition to the advantages of physically separating data into discrete datastores, such a data release filter approach provides a proxy interface to the datastore. Accordingly, real-time, runtime-based data release policies are enabled, based on the requested data, the context associated with that data, and the additional context provided by the application itself.

Figure 7:
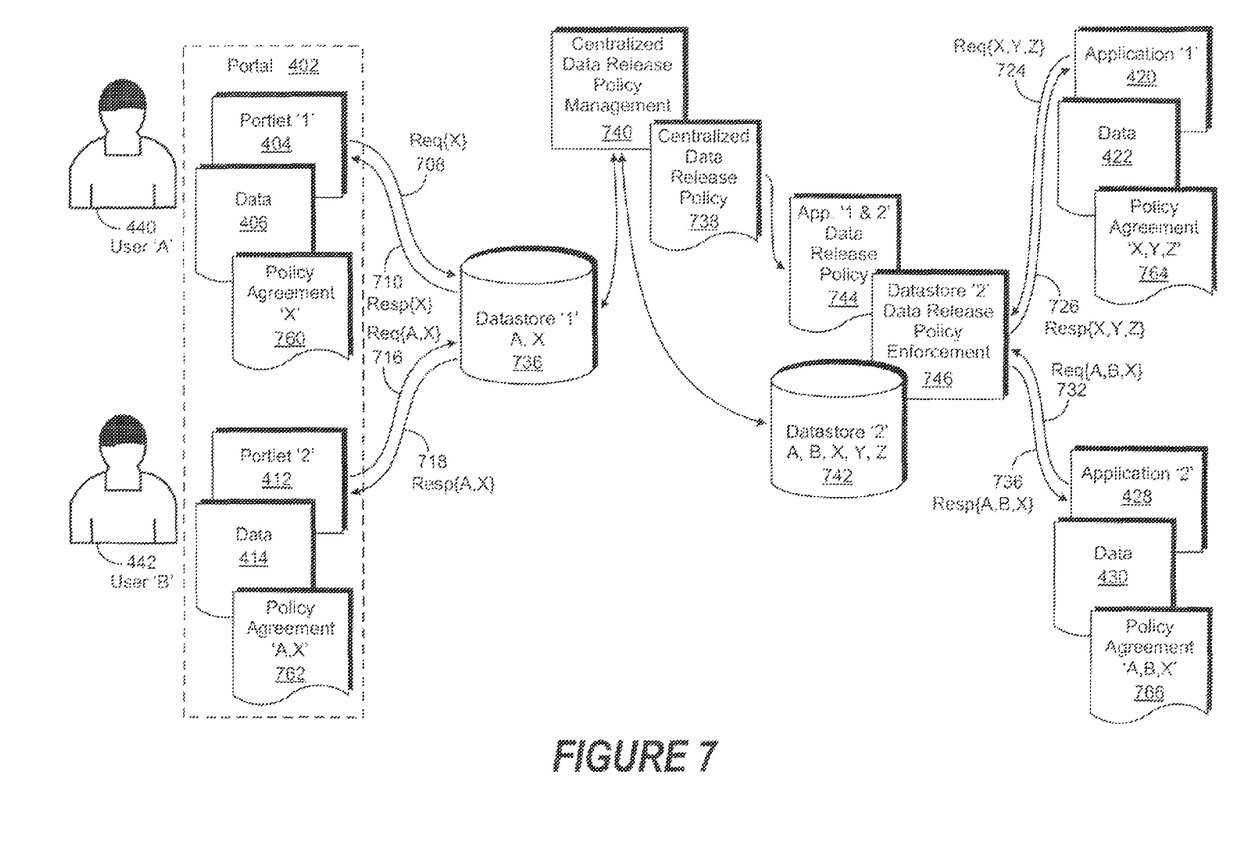
FIG. 7 shows the distributed enforcement of application-specific data release policies for a consolidated datastore.

FIG. 7 shows the distributed enforcement of distributed, application-specific data release policies for a consolidated datastore as implemented in an embodiment of the invention. In this embodiment, the release of data stored in datastores '1' 736 and '2' 742 is centrally controlled by the centralized data release policy management module 740 according to centralized data release policy 738. In turn, the centralized data release policy management module 740 is operable to use the centralized data release policy 638 to update the application '1 & 2' data release policy 744. Accordingly, the release of data stored in datastore '2' 742 is further controlled by datastore '2' data enforcement module 746 according to the application '1 & 2' data release policy 744. As a result, the data 'X', 'Y', 'Z' available to application '1' 420 and the data 'A', 'B', 'X' available to application '2' 428 from datastore '2' 744 is doubly-filtered.

As shown in FIG. 7, datastore '1' 736 comprises data 'A', 'X', whereas datastore '2' 742 comprises data 'A', 'B', 'X', 'Y', 'Z'. Portlet '1' 404 places a request 708 on behalf of user 'A' 440 for data 'X' from datastore '1' 736. The data release policy management module 740 then checks to see if the request is allowed by data release policy 738, and if so, a response 710 comprising data 'X' 406 and data release policy agreement 'X' 760 is returned. Likewise, portlet '2' 412 places a request 716 on behalf of user 'B' 442 for data 'A' and 'X'. The data release policy management module 740 then checks to see if the request is allowed by data release policy 738, and if so, a response 716 comprising data 'A,X' 414 and data release policy agreement 'A,X' 762 is returned. As shown in FIG. 6, the data release policy agreements 'X' 760 and 'A,X' 762 are generated and managed by the centralized data release policy management module 740 to enforce the centralized data release policy 738.

Likewise, application '1' 420 places a request 724 for data 'X', 'Y' and 'Z' stored in datastore '2' 742. The datastore '2' data release policy management module 748 then checks to see if the request from application '1' 420 is allowed by the application '1 & 2' data release policy 744, and if so, a response 726 comprising filtered data 'X,Y,Z' 422 and data release policy agreement 'X,Y,Z' 764 is returned. Application '2' 428 likewise places a request 732 for data 'A', 'B', and 'X' stored in datastore '2' 742. The datastore '2' data release policy enforcement module 746 then checks to see if the request is allowed by application '1 & 2' data release policy 744, and if so, a response 734 comprising filtered data 'A,B, X' 430 and data release policy agreement 'A,B,X' 766 is returned. As shown in FIG. 6, the data release policy agreements 'X,Y,Z' 764 and 'A,B,X' 766 are generated and managed by the datastore '2' data release policy enforcement module 746 to enforce the application '1&2' data release policy 744.

It will be appreciated that having the application '1 & 2' data release policy 744 take into account the identity of application '1' 420 and '2' 428 allows multiple applications to share the same datastore. It will be further appreciated that such a data release filter approach provides a proxy interface to the datastore. Accordingly, real-time, runtime-based data release policies are enabled, based on the requested data, the context associated with that data, and the additional context provided by the application itself. In addition, each local data enforcement point (e.g., datastore '2' data enforcement module 746) maintains a local copy of the data release policy, and further only maintains the data release policy necessary to manage the data required by applications '1' 420 and '2' 428.

Figure 8:
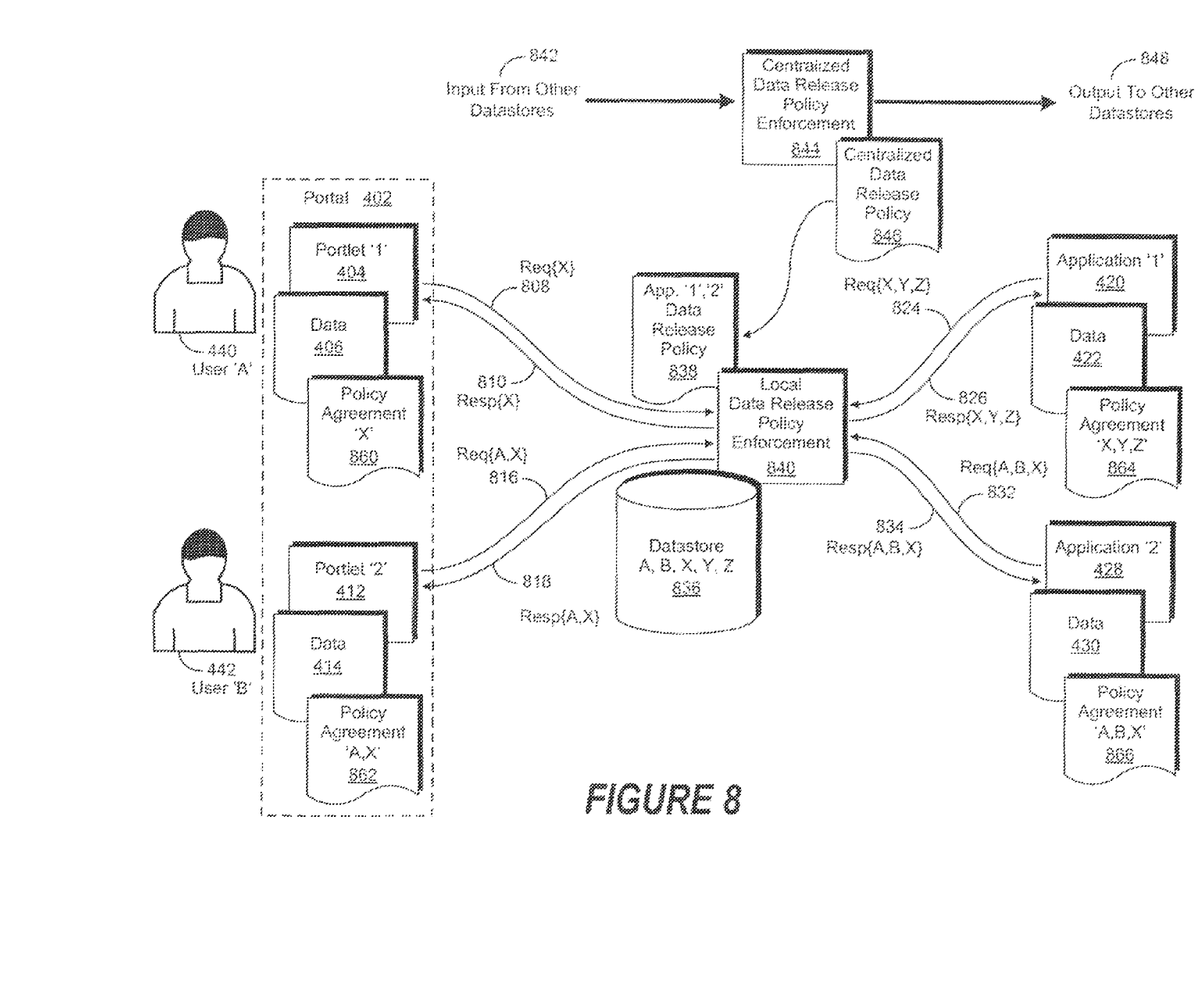
FIG. 8 shows the real-time enforcement of distributed, application-specific data release policies for a consolidated datastore.

FIG. 8 shows the real-time enforcement of distributed, application-specific data release policies for a consolidated datastore as implemented in accordance with an embodiment of the invention. In this embodiment, the release of data stored in datastore 836 is controlled by the local data release policy enforcement module 840 according to the application '1 & 2' data release policy 838. In turn, the centralized data release policy enforcement module 844 is operable to use the centralized data release policy 846 to update application '1 & 2' data release policy 838 which is controlled by the local data release policy enforcement module 840. In one embodiment, the centralized data release policy enforcement module 844 is operable to receive input from other datastores 842 and to provide output to other datastores 848.

Accordingly, the release of data stored in datastore '1' 836 is controlled by the local data enforcement module 840 according to the application '1 & 2' data release policy 838. As a result, the data 'X', 'Y', 'Z' available to application '1' 420 and the data 'A', 'B', 'X' available to application '2' 428 from datastore '2' 744 is doubly-filtered. Likewise, data 'X' available to portlet '1' 404 and data 'A' and 'X' available to portlet '2' 412 is also doubly-filtered.

As shown in FIG. 8, the datastore 836 comprises data 'A', 'B', 'X', 'Y', 'Z'. Portlet '1' 404 places a request 808 on behalf of user 'A' 440 for data 'X' from datastore '1' 836. The local data release policy enforcement module 840 then checks to see if the request is allowed by the application '1 & 2' data release policy 838, and if so, a response 810 comprising data 'X' 406 and data release policy agreement 'X' 860 is returned. Likewise, portlet '2' 412 places a request 816 on behalf of user 'B' 442 for data 'A' and 'X'. The local data release policy enforcement module 840 then checks to see if the request is allowed by application '1 & 2' data release policy 838, and if so, a response 816 comprising data 'A,X' 414 and data release policy agreement 'A,X' 862 is returned. As shown in FIG. 8, the data release policy agreements 'X' 860 and 'A,X' 862 are generated and managed by the local data release policy enforcement module 840 to enforce the application '1 & 2'0 data release policy 838.

Likewise, application '1' 420 places a request 824 for data 'X', 'Y' and 'Z' stored in the datastore 836. The local data release policy enforcement module 840 then checks to see if the request from application '1' 420 is allowed by the application '1 & 2' data release policy 838, and if so, a response 826 comprising filtered data 'X,Y,Z' 422 and data release policy agreement 'X,Y,Z' 864 is returned. Application '2' 428 likewise places a request 832 for data 'A', 'B', and 'X' stored in the datastore 836. The local data release policy enforcement module 840 then checks to see if the request is allowed by application '1 & 2' data release policy 838, and if so, a response 834 comprising filtered data 'A,B,X' 430 and data release policy agreement 'A,B,X' 866 is returned. As shown in FIG. 8, the data release policy agreements 'X,Y,Z' 864 and 'A,B,X' 866 are generated and managed by the local data release policy enforcement module 840 to enforce the application '1&2' data release policy 838.

It will be appreciated that having the application '1 & 2' data release policy 838 take into account the identity of application '1' 420 and '2' 428 allows multiple information consumers to share the same datastore. It will be further appreciated that such a data release filter approach provides a proxy interface to the datastore. Accordingly, real-time, runtime-based data release policies are enabled, based on the requested data, the context associated with that data, and the additional context provided by the information consumer itself. In addition, each local data enforcement point (e.g., local data enforcement module 840) maintains a local copy of the data release policy, and further only maintains the data release policy necessary to manage the data required by applications '1' 420 and '2' 428. Additionally, this data release enforcement functionality is operable to provide real-time, runtime control of specific data within the datastore, as required, based on the requesting application.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for controlling the distribution of data, comprising:

filtering a set of data stored in a first datastore to generate a first set of filtered data, wherein the filtering is performed according to a first data release policy;

generating a first data release policy agreement corresponding to the first data release policy;

providing the first set of filtered data and the first data release policy agreement to a first information consumer; and enforcing the first data release policy with the first data release policy agreement;

providing the first set of filtered data to a second datastore;

filtering the first set of filtered data according to a second data release policy to generate a second set of filtered data;

generating a second data release policy agreement;

providing the second set of filtered data and the second data release policy agreement to a second information consumer; and using the second data release policy agreement to enforce the second data release policy; and wherein the first data release policy is enforced by the first data release policy agreement upon the acceptance of the first data release policy agreement by the first information consumer;

the filtered data is masked according to the first data release policy;

the filtering is performed according to metadata associated with the set of data and according to attributes associated with the set of data;

the first data release policy is centralized and the second data release policy is distributed; and, the second data release policy agreement is based upon a level of trust of a consumer of the second set of filtered data.

2. The method of claim 1, wherein:

the set of data stored in the first datastore is filtered according to a third data release policy to generate a third set of filtered data;

a third data release policy agreement corresponding to the third data release policy is generated;

the third set of filtered data and the third data release policy agreement are provided to the first information consumer; and the third data release policy agreement is used to enforce the third data release policy.

3. The method of claim 1, wherein:

the first data release policy is centralized and the second data release policy is distributed; and the first data release policy is used to update the second data release policy.

4. The method of claim 1, wherein:

the second data release policy is associated with the second information consumer; and the second data release policy is used as a proxy by the second information consumer to access the first set of filtered data.

* * * * *